United States Patent [19]

van Rensburg

[11] Patent Number: 4,667,696

[45] Date of Patent: May 26, 1987

[54] FLOW VALVE

[76] Inventor: Gert N. J. van Rensburg, 21 Koper Street, Farrarmere, Ext. 21, Benoni, Transvaal, South Africa

[21] Appl. No.: 882,824

[22] Filed: Jul. 7, 1986

Related U.S. Application Data

[63] Continuation-in-part of Ser. No. 720,033, Apr. 4, 1985, abandoned.

[51] Int. Cl.⁴ ............................................. F16K 17/20
[52] U.S. Cl. ............................... 137/533.15; 137/901; 251/82; 251/361
[58] Field of Search ................... 137/533, 533.11, 901, 137/533.13, 533.15; 251/82, 361

[56] References Cited

U.S. PATENT DOCUMENTS

| 685,438 | 10/1901 | Warburton | 251/361 |
|---|---|---|---|
| 971,295 | 9/1910 | Menear et al. | 137/901 |
| 3,498,315 | 3/1970 | Graves et al. | 137/533.11 |
| 3,648,729 | 3/1972 | Balkany | 137/533.15 |
| 4,393,895 | 7/1983 | Rubey | 137/539.5 |
| 4,513,778 | 4/1985 | Vadasz | 137/533.11 |

FOREIGN PATENT DOCUMENTS

| 1107601 | 8/1981 | Canada | 137/533.11 |
|---|---|---|---|
| 69016 | 9/1968 | Fed. Rep. of Germany . | |
| 1199662 | 12/1959 | France | 251/361 |
| 7344213 | 7/1975 | France . | |
| 2538873 | 7/1984 | France | 137/533.11 |
| 566043 | 8/1957 | Italy | 251/82 |
| 142554 | 3/1920 | United Kingdom . | |
| 310738 | 5/1929 | United Kingdom . | |

Primary Examiner—Martin P. Schwadron
Assistant Examiner—Sheri M. Novack
Attorney, Agent, or Firm—Kinzer, Plyer, Dorn & McEachran

[57] ABSTRACT

An adjustable nonreturn ball valve for connection in a pipeline includes an elongate unobstructed main housing arranged to be connected at each end to flow pipes. There is an auxiliary housing located intermediate the ends of the main housing which has a longitudinal axis obtuse to the longitudinal axis of the main housing. There is a removable circular valve seat extending across the main housing at an obtuse angle relative thereto. The main housing is formed in two sections which are joined together at the plane of the valve seat. A ball is positioned to close upon the valve seat and is loosely entrapped in the auxiliary housing to allow flow in only one direction through the main housing, in which event and in use the ball automatically rides up in the auxiliary housing and away from the valve seat. The ball and the auxiliary housing have diameters greater than the diameter of the main housing, thereby preventing the ball from moving through the main housing. The junction of the auxiliary housing and the main housing form a ramp to assist in moving the ball into the auxiliary housing in response to flow through the main housing. There is an adjustable, mechanically operable closure device for the valve which fits at an upper end of the auxiliary housing and is arranged to urge and hold the ball downwards toward the valve seat to throttle or close off the valve according to the setting of the closure device.

6 Claims, 4 Drawing Figures

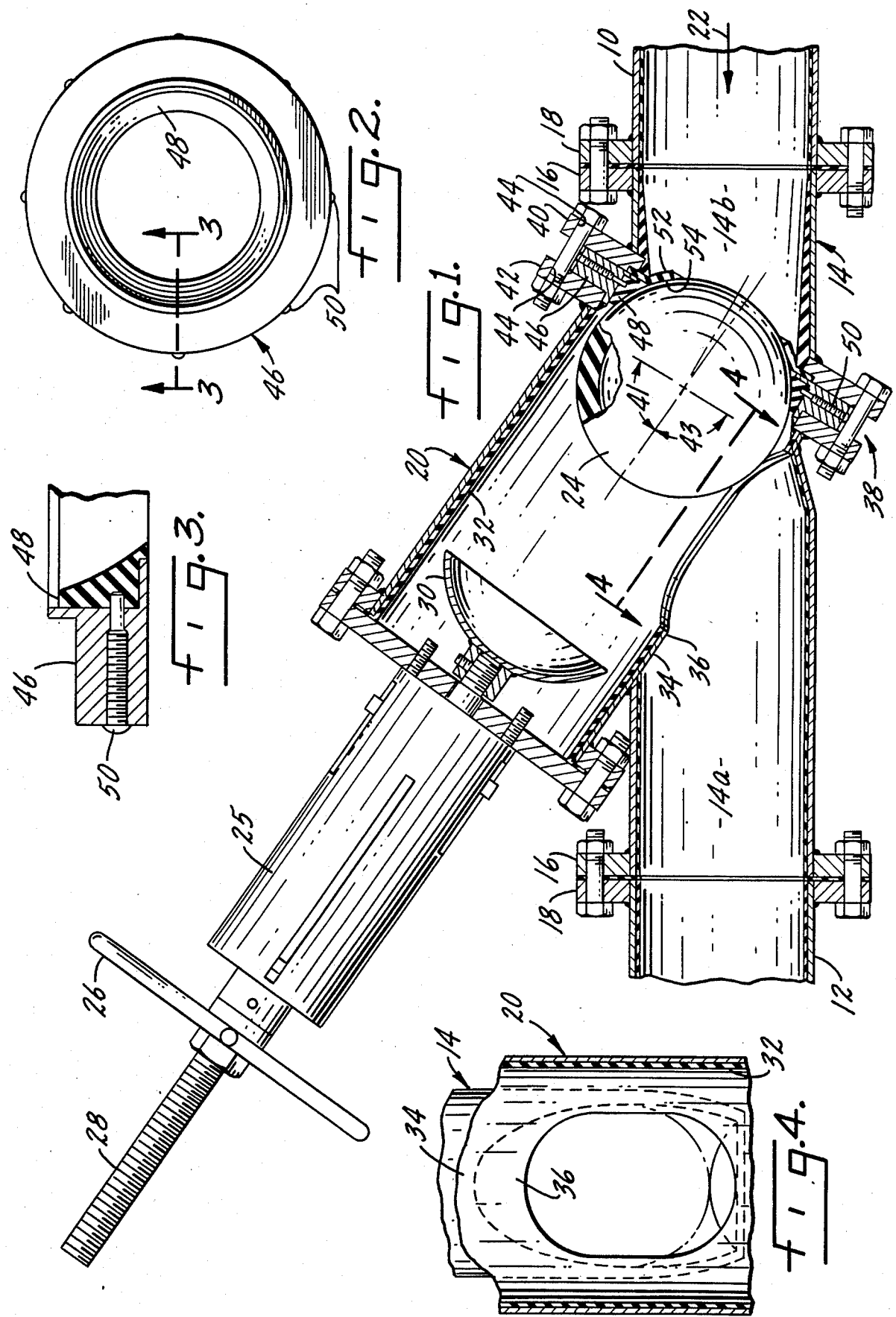

FLOW VALVE

CROSS REFERENCE TO RELATED APPLICATION

This is a continuation-in-part of application Ser. No. 720,033, filed Apr. 4, 1985, now abandoned.

SUMMARY OF THE INVENTION

The present invention relates to adjustable nonreturn ball valves for use in pipelines and has particular relation to such a valve which is simple in construction and extremely reliable in operation.

A primary purpose of the invention is a nonreturn ball valve of the type described in which the connection between the auxiliary housing for the ball valve and the main housing, which may be a part of a pipeline, provides a ramp to assist movement of the ball valve up into the auxiliary housing in response to flow through the main housing.

Another purpose is a ball valve of the type described having utility in large diameter pipes, such as found in oil pipelines and in the transmission of slurries used in mining operations and in power plants.

Another purpose is a ball valve of the type described having a removable valve seat which consists of an insert positioned between two fastened flanges, which insert may be not only removed, but also rotated to provide full use of its wear capabilities.

Another purpose is a ball valve of the type described in which the angle of the valve seat is obtuse to the longitudinal axis of the main pipe and slightly off from an angle perpendicular to the axis of the auxiliary housing so as to permit fluid flowing through the main housing to give an upward assist in movement of the ball valve out of a valve closing position.

Another purpose is a ball valve as described in which the ball valve and its auxiliary housing have a diameter greater than that of the main housing so as to permit controlled movement of the valve to and from a valve closing position.

Another purpose is a ball valve of the type described in which the main housing is unobstructed to permit a cleaning device to move therethrough.

Other purpose will appear in the ensuing specification, drawings and claims.

BRIEF DESCRIPTION OF THE DRAWINGS

The invention is illustrated diagrammatically in the following drawings wherein:

FIG. 1 is a vertical section through a ball valve as described;

FIG. 2 is a top plan view of the seal illustrated in FIG. 1;

FIG. 3 is a section on an enlarged scale along plane 3—3 of FIG. 2; and

FIG. 4 is a section along plane 4—4 of FIG. 1, illustrating the junction between the main and auxiliary housings.

DETAILED DESCRIPTION OF THE INVENTION

The present invention is directed to an adjustable nonreturn ball valve having utility in large diameter pipelines, for example as used in the petroleum industry and mining and power plants. The valve provides for automatic closure preventing backflow, as well as functioning as a gate valve in that it may be positively closed. It has found advantageous use in large diameter pipelines carrying notoriously abrasive and corrosive slurries, such as those found in various mining operations and in power generating environments.

In FIG. 1, sections of a pipeline are indicated at 10 and 12, respectively, with the main housing of the valve of the present invention, indicated at 14, being connected therebetween. The ends of main housing 14 may have flanges 16 which can be bolted or otherwise connected to mating flanges 18 at the ends of pipeline sections 10 and 12. Main housing 14 will have an internal diameter generally the same as the internal diameter of pipeline sections 10 and 12.

An auxiliary housing 20 extends at an obtuse angle to the longitudinal axis of main housing 14, when considering the direction of flow through the valve as indicated by arrow 22. The preferred angle for the axis of auxiliary housing 20 relative to the longitudinal axis of main housing 14 is on the order of about 60°. However, the angle will vary depending upon the fluid flowing through the pipeline. The angle is important relative to insuring opening of the valve in response to fluid flow, as will be described in greater detail hereinafter.

Positioned within auxiliary housing 20 is a ball 24 which is positioned in a valve closing position in FIG. 1 and which can move up within the auxiliary housing to a valve open position. Attached to the upper end of auxiliary housing 20 is a control mechanism 25 including an exterior handle 26 which through a threaded shaft 28 is effective to position a generally spherical-shaped cup 30 which is arranged to control the position of ball 24. When cup 30 is in the full up position, as illustrated in FIG. 1, ball 24 has complete freedom to move down into the main housing or up into the auxiliary housing. To close off the valve, handle 26 is rotated to move cup 30 down to a position where it firmly holds ball 24 in a valve closing position. There are intermediate positions of cup 30 which can be utilized to position the ball for throttling flow through the valve.

The inside of auxiliary housing 20 may be lined with a rubber coating 32 and may have an internal diameter slightly greater than that of ball 24. Both the ball and the interior of auxiliary housing 20 have a diameter greater than that of main housing 14. For example, the ball may have a diameter which is on the order of about 10 percent greater than the diameter of the main housing. Thus, the ball cannot move into the main housing and is only effective to open or close the main housing so as to permit or prevent fluid flow therethrough. Because auxiliary housing 20 has a larger diameter than ball 24, the ball is free to rotate during use and such rotation cleans the ball surface as well as scouring the mating surface of the valve seat.

Preferably, ball 24 is formed of a stainless steel material and it may have a covering of an elastomeric material resistant to the particular fluid which is flowing through the pipeline. For example, an elastomeric material which might be resistant to gasoline or petroleum products would not be resistant to an acid or to the material in a pipeline or power plant slurry. The weight of ball 24 will also be dependent upon the type of material in the pipeline. The heavier or more viscous the fluid that is going through the pipeline, the greater must be the weight of the ball so that it will automatically drop down to a valve closing position in the event that there is backflow through the valve.

Main housing 14 is formed of two sections, a left-hand section 14a and a right-hand section 14b. The auxiliary housing 20 will be welded to main housing section 14a. In the process of welding together two pipes of differing diameters and which join each other at an angular relationship as described, there will be a substantially peripheral ramp, indicated at 34 and shown in particular in FIG. 4, at the junction of the two pipes. This ramp assists movement of ball 24 up into the auxiliary housing in response to flow in the direction of arrow 22 through the main housing. In addition to extending peripherally about main housing 14a, ramp 34 also extends, at least in part, within the diameter of main housing 14a, as particularly indicated at 36 in FIG. 1.

To a very small degree, the ramp reduces the flow of fluid through the main housing at the junction of the main housing and the auxiliary housing. The main housing is still effectively unobstructed, as the ramp only has a slight extension within it. The fact that the main housing is unobstructed is important as conventionally in pipelines of the type described herein a cleanout device is periodically flushed or run through the pipeline to remove any obstructions. Such a cleanout device may be in the form of a brush or similar device having flexibility at its perifery so that the intrusion of ramp 34 within the main housing will not restrict movement of the cleanout device.

At the junction of the main housing and the auxiliary housing, there is a valve seat, indicated generally at 38, which consists of two spaced flanges, flange 40 being welded to main housing section 14b and flange 42 being welded to auxiliary housing 20. The flanges are spaced apart and held together by bolts which pass through aligned openings 44. Intermediate flanges 40 and 42 is a valve seat insert 46, circumferential in configuration and carrying a valve seat element 48 at its interior. Valve seat element 48 has a spherical cross section and may be formed of an elastomeric material, or in some instances it may be metallic. Valve seat element 48 is held to valve seat insert 46 by a plurality of circumferentially-positioned fastening devices 50. Also forming a part of the valve seat is an annular rubber element 52 which is attached to flange 44 and extends inwardly within the main housing in the nature of a flap. The inner surface 54 of rubber element 52 is sufficiently flexible to conform to the contour of ball 24 when the ball is in a valve closing position and is also sufficiently flexible so as not to provide any obstruction to flow through the main housing or the passage of a cleanout device through the main housing.

The angle of the plane of the valve seat relative to the longitudinal axis of auxiliary housing 20 is important. The plane of the valve seat is not perpendicular to the axis but may be slightly off from the pependicular, and preferably approximately 5°. Thus, the angle between the longitudinal axis of auxiliary housing 20 and that portion of the valve seat above the longitudinal axis, indicated at 41, is 85°, whereas the angle between the longitudinal axis and that portion of the plane of the valve seat below the longitudinal axis, indicated at 43, is 95°. This is important for two reasons. First, it applies a greater force from the ball to the bottom of the valve seat, and second, such an angle tends to assist the ball in moving up the ramp in response to flow through the valve.

In operation, when there is no flow through the valve and when cup 30 is in its fully retracted position, the ball will rest in the position of FIG. 1. In response to fluid flow, the ball will move up into the auxiliary housing to the extent permitted by cup 30. As long as there is flow, the ball will remain in the up position. When flow stops or when there is flow in the reverse direction, the ball will drop down to the position of FIG. 1, closing off reverse flow through the valve. The valve functions in the nature of a gate valve when cup 30 is moved down to the fully closed position in which it holds ball 24 against the valve seat.

The valve seat insert is removable as it is held between flanges 40 and 42. Thus, the valve seat insert may not only be removed and replaced as wear dictates, but it may also be rotated. The predominant area of wear will be at the bottom of the valve seat where a major part of the weight of the ball is applied when the ball is in a closing position. Thus, a loosening of the bolts holding flanges 40 and 42 together permit the valve seat insert to be rotated so that the valve seat insert does not have to be replaced until all areas of it have worn to the point where replacement is required. In this connection, the entire insert need not be replaced, but only that portion 48 which actually receives the thrust of the ball when it is in a valve closing position.

The obtuse angle formed between the axis of auxiliary housing 20 and the axis of main housing 14 is important in that it not only reduces the thrust required to move the ball out of a valve closing position, but it also retards or slows the ball when moving to a valve closing position, thus eliminating the possibility of what is known as "water hammer" caused by an abrupt closing of a valve in a fluid pipe. If the angle of the auxiliary housing to the main housing is too abrupt, approaching 90°, then it is difficult for the ball to move up in response to the flow of fluid, particularly if the ball is heavy as would be required in a heavy or viscous liquid.

Whereas the preferred form of the invention has been shown and described herein, it should be realized that there may be many modifications, alterations and substitutions thereto.

What is claimed:

1. In an adjustable nonreturn ball valve for connection in a pipeline including an elongate unobstructed main housing arranged to be connected at each end to flow pipes, an auxiliary housing located intermediate the ends of the main housing and having a longitudinal axis obtuse to the longitudinal axis of the main housing, a removable circular valve seat at a lower end of said auxiliary housing extending across the main housing at an obtuse angle relative thereto, the plane of said valve seat and the axis of said auxiliary housing forming an angle slightly less than 90° in the quadrant above said axis and away from said valve seat and an angle slightly greater than 90° in the quadrant below said axis and away from said valve seat, said main housing being formed of two sections joined together at the plane of said valve seat, a ball positioned to close upon said valve seat with the angular relationship between said valve seat and auxiliary housing axis applying a greater closing force to the bottom of said valve seat than the top, said ball being loosely entrapped in the auxiliary housing to allow a flow in only one direction through the main housing, in which event and in use the ball automatically rides up in the auxiliary housing and away from the valve seat, said ball and said auxiliary housing having diameters greater than the diameter of said main housing, thereby preventing the ball from moving through the main housing, the junction of said auxiliary housing and said main housing forming a ramp to assist in moving said ball into said auxiliary housing in response to flow through said main housing, and an adjustable, mechanically operable closure device for the valve which fits at an upper end of the auxiliary housing and is arranged to hold the ball downwards toward the valve seat throttle or close off the valve according to the setting of the closure device.

2. The adjustable nonreturn ball valve of claim 1 further characterized in that the longitudinal axis of the auxiliary housing is displaced approximately 60° from the longitudinal axis of the main housing.

3. The adjustable nonreturn ball valve of claim 1 further characterized in that the plane of said valve seat is approximately 5° to a plane transverse to the longitudinal axis of said auxiliary housing.

4. The adjustable nonreturn ball valve of claim 1 further characterized in that said ramp is generally elliptical in shape, with a lower portion of said ramp terminating at said valve seat.

5. The adjustable non return ball valve of claim 1 further characterized in that said removable valve seat includes spaced peripheral flanges, means for fastening said flanges together, a removable insert having an interior surface generally spherical in configuration to mate with said ball and positioned intermediate said flanges, said valve seat including an annular flexible member attached thereto and having an interior peripheral area formed and adapted to be yieldingly engaged with said ball when it is seated upon said valve seat.

6. The adjustable nonreturn ball valve of claim 1 further characterized in that said ramp extends partly within said main housing.

* * * * *